(12) United States Patent
Tamai et al.

(10) Patent No.: US 7,646,289 B2
(45) Date of Patent: Jan. 12, 2010

(54) FUEL ECONOMY INDICATOR LAMP CONTROL SYSTEM

(75) Inventors: Goro Tamai, West Bloomfield, MI (US); Mark A. Zerbini, Canton, MI (US); Alan J. Houtman, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 374 days.

(21) Appl. No.: 11/626,488

(22) Filed: Jan. 24, 2007

(65) Prior Publication Data

US 2007/0296567 A1   Dec. 27, 2007

Related U.S. Application Data

(60) Provisional application No. 60/816,686, filed on Jun. 27, 2006.

(51) Int. Cl.
*B60Q 1/00* (2006.01)

(52) U.S. Cl. .............. 340/439; 340/438; 340/450.2; 340/457; 180/65.21; 701/22

(58) Field of Classification Search .......... 340/439, 340/450.2, 450.3, 457, 457.4, 438; 180/65.2, 180/65.21; 701/22
See application file for complete search history.

(56) References Cited

U.S. PATENT DOCUMENTS

| | | | |
|---|---|---|---|
| 6,687,581 B2 * | 2/2004 | Deguchi et al. | 701/22 |
| 7,231,994 B2 * | 6/2007 | Buglione et al. | 180/65.31 |
| 7,259,664 B1 * | 8/2007 | Cho et al. | 340/450.2 |

* cited by examiner

*Primary Examiner*—Anh V La

(57) ABSTRACT

A fuel economy (FE) indicator lamp regulation system for a hybrid electric vehicle having an internal combustion engine includes an FE indicator lamp, a first module that calculates an instantaneous FE of the hybrid electric vehicle and a second module that determines a velocity of the hybrid electric vehicle. A third module switches the FE indicator lamp between an on state and an off state based on the instantaneous FE and the vehicle speed.

22 Claims, 5 Drawing Sheets

FUEL ECONOMY INDICATOR LAMP CONTROL SYSTEM

CROSS-REFERENCE TO RELATED APPLICATIONS

This application claims the benefit of U.S. Provisional Application No. 60/816,686, filed on Jun. 27, 2006. The disclosure of the above application is incorporated herein by reference.

FIELD

The present disclosure relates to hybrid vehicles, and more particularly to a fuel economy indicator lamp control system for a hybrid vehicle.

BACKGROUND

Hybrid vehicles are driven by multiple powerplants including, but not limited to an internal combustion engine and an electric machine. The electric machine functions as a motor/generator. In a generator mode, the electric machine is driven by the engine to generate electrical energy used to power electrical loads or charge batteries. In a motor mode, the electric machine supplements the engine, providing drive torque to drive the vehicle drivetrain.

Improved fuel economy (FE) and ecological sentiment are motivating factors for hybrid vehicle purchase. Traditionally, hybrid manufacturers provide a labeled FE ratings including city and highway FE ratings. Although the label FE, as well as real-world fuel economy, of hybrid vehicles is usually higher than those of their non-hybrid counterparts, hybrid vehicles have been criticized for lower than expected FE.

SUMMARY

Accordingly, the present disclosure provides a fuel economy (FE) indicator lamp regulation system for a hybrid electric vehicle having an internal combustion engine. The FE indicator lamp regulation system includes an FE indicator lamp, a first module that calculates an instantaneous FE of the hybrid electric vehicle and a second module that determines a velocity of the hybrid electric vehicle. A third module switches the FE indicator lamp between an on state and an off state based on the instantaneous FE and the vehicle speed.

In another feature, the FE indicator lamp is switched to the off state when the velocity is outside of a velocity range that is defined between a minimum velocity threshold and a maximum velocity threshold.

In another feature, the third module determines an FE threshold based on the velocity and switches the FE indicator lamp to the on state when the instantaneous FE remains above the FE threshold for a threshold time period.

In another feature, the third module determines an FE threshold based on the velocity and switches the FE indicator lamp to the off state when the instantaneous FE remains below the FE threshold for a threshold time period.

In another feature, the third module initiates an off timer upon switching the FE indicator lamp to the off state, wherein switching of the indicator lamp to the on state is inhibited until the off timer achieves a threshold time.

In still another feature, the FE indicator lamp regulation system further includes a fourth module that selectively initiates a hybrid engine off mode. The third module switches the FE indicator lamp to the on state when in the hybrid engine off mode for a threshold time period.

In yet other features, the FE indicator lamp regulation system further includes a fourth module that monitors an accelerator pedal position. The third module switches the FE indicator lamp to the off state when the instantaneous FE is below a threshold FE for a threshold time. The threshold time is determined based on the accelerator pedal position. More specifically, the threshold time is reduced when the accelerator pedal position exceeds a threshold accelerator pedal position.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
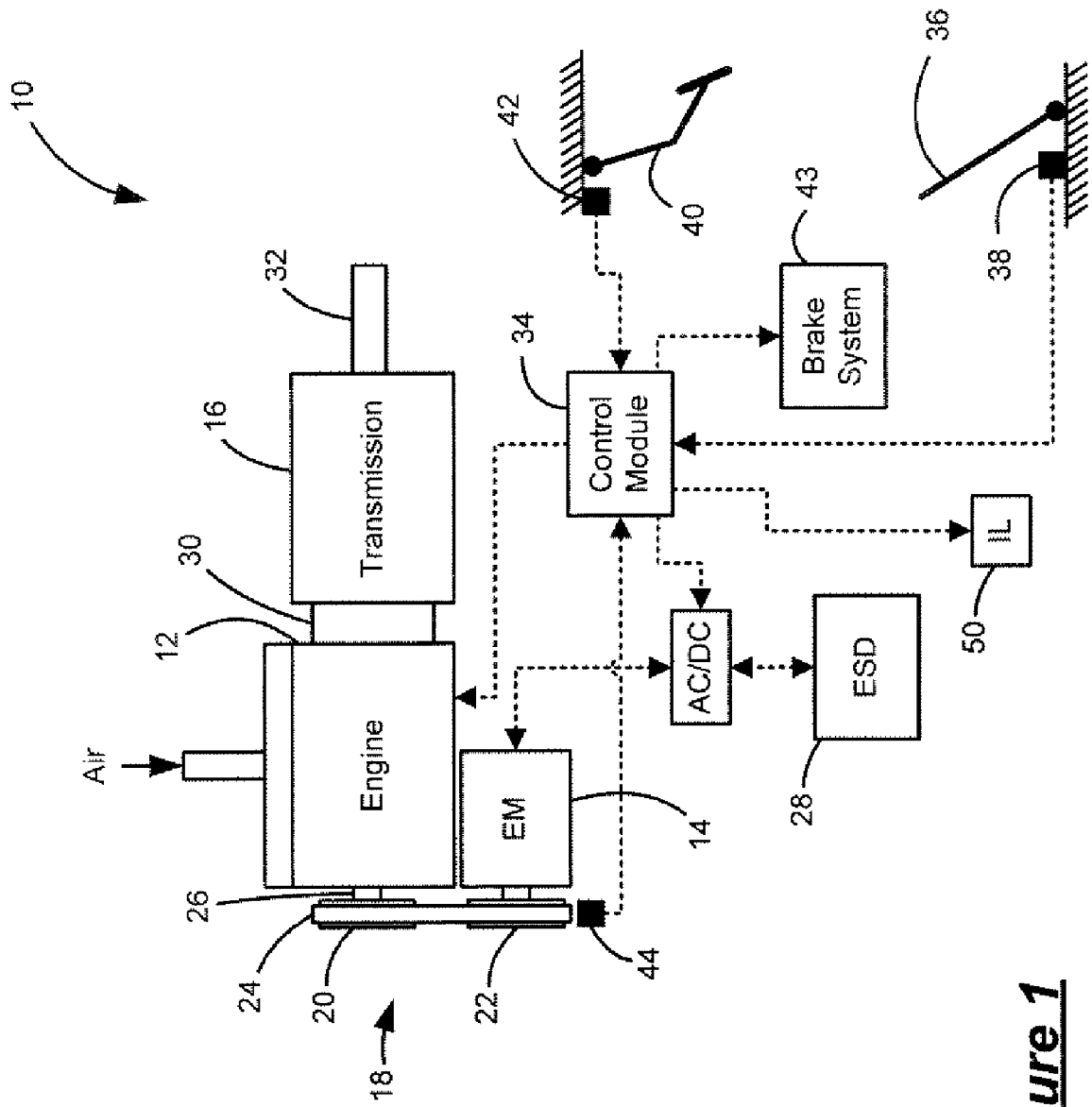
FIG. 1 is a schematic illustration of an exemplary hybrid vehicle that is operated based on the fuel economy (FE) indicator lamp illumination control according to the present disclosure.

The following description of the preferred embodiment is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary hybrid vehicle 10 includes an engine 12 and an electric machine 14, which drive a transmission 16. More specifically, the electric machine 14 supplements the engine 12 to produce drive torque to drive the transmission 16. In this manner, fuel efficiency is increased and emissions are reduced. The engine 12 and electric machine 14 are coupled via a belt-alternator-starter (BAS) system 18. More specifically, the electric machine 14 operates as a starter (i.e., motor) and an alternator (i.e., generator) and is coupled to the engine 12 through a belt and pulley system. The engine 12 and the electric machine 14 include pulleys 20, 22, respectively, that are coupled for rotation by a belt 24. The pulley 20 is coupled for rotation with a crankshaft 26 of the engine 12.

In one mode, the engine 12 drives the electric machine 14 to generate power used to recharge an energy storage device (ESD) 28. In another mode, the electric machine 14 drives the engine 12 using energy from the ESD 28. The ESD 28 can include, but is not limited to, a battery or a super-capacitor. Alternatively, the BAS system 18 can be replaced with a flywheel-alternator-starter (FAS) system (not shown), which includes an electric machine operably disposed between the engine and the transmission or a chain or gear system that is implemented between the electric machine 14 and the crankshaft 26.

The transmission 16 can include, but is not limited to, a manual transmission, an automatic transmission, a continuously variable transmission (CVT) and an automated manual transmission (AMT). Drive torque is transferred from the engine crankshaft 26 to the transmission 16 through a coupling device 30. The coupling device 30 can include, but is not limited to, a friction clutch or a torque converter depending upon the type of transmission implemented. The transmission 16 multiplies the drive torque through one of a plurality of gear ratios to drive a driveshaft 32.

A control module 34 regulates operation of the vehicle 10. The control module 34 controls fuel injection and spark to selectively activate and deactivate cylinders of the engine 12. More specifically, when the vehicle 10 is at rest, none of the cylinders of the engine 12 are firing (i.e., are deactivated) and the engine 12 is stopped. During vehicle launch (i.e., acceleration from rest), the electric machine 14 drives the crankshaft to spin-up the engine 12 to an idle RPM and to initiate vehicle acceleration. During periods where low drive torque is needed to drive the vehicle (i.e., a hybrid engine off (HEOff) mode), drive torque is provided by the electric machine 14. When in the HEOff mode, fuel and spark are cut-off to the cylinders of the engine. Further, opening and closing cycles of the intake and exhaust valves can be prevented to inhibit air flow processing within the cylinders.

An accelerator pedal 36 is provided. A pedal position sensor 36 is sensitive to a position of the accelerator pedal 36 and generates a pedal position signal based thereon. A brake pedal 40 is provided. A brake pedal position sensor 42 is sensitive to a position of the brake pedal 40 and generates a pedal position signal based thereon. The control module 34 operates a brake system 43 based on the brake pedal position signal to adjust a pressure within the brake system, which in turn regulates a braking force of brakes (not shown). A speed sensor 44 is responsive to the rotational speed ($RPM_{EM}$) of the electric machine 44. The speed sensor 44 generates a speed signal. The control module 34 operates the vehicle 10 based on the pedal position signals generated by the pedal position sensors 38, 42 and the speed signal generated by the speed sensor 44, as described in further detail below. The engine speed ($RPM_{ENG}$) can be determined based on the speed signal. More specifically, $RPM_{EM}$ can be multiplied by the known pulley ratio to provide $RPM_{ENG}$.

An instrument panel is also provided and includes a fuel economy (FE) telltale or indicator lamp 50 that is selectively lit when the vehicle is operating within a desired FE range. More specifically, the FE indicator lamp control of the present disclosure recognizes that FE feedback from the vehicle's instrument panel can be helpful in improving customers' driving style to achieve better fuel economy. Accordingly, the FE indicator lamp control determines whether the vehicle is operating at good or desired FE and illuminates the indicator lamp 50 accordingly. Anti-busy control is also implemented to inhibit flashing of the FE indicator lamp 50.

Figure 2:
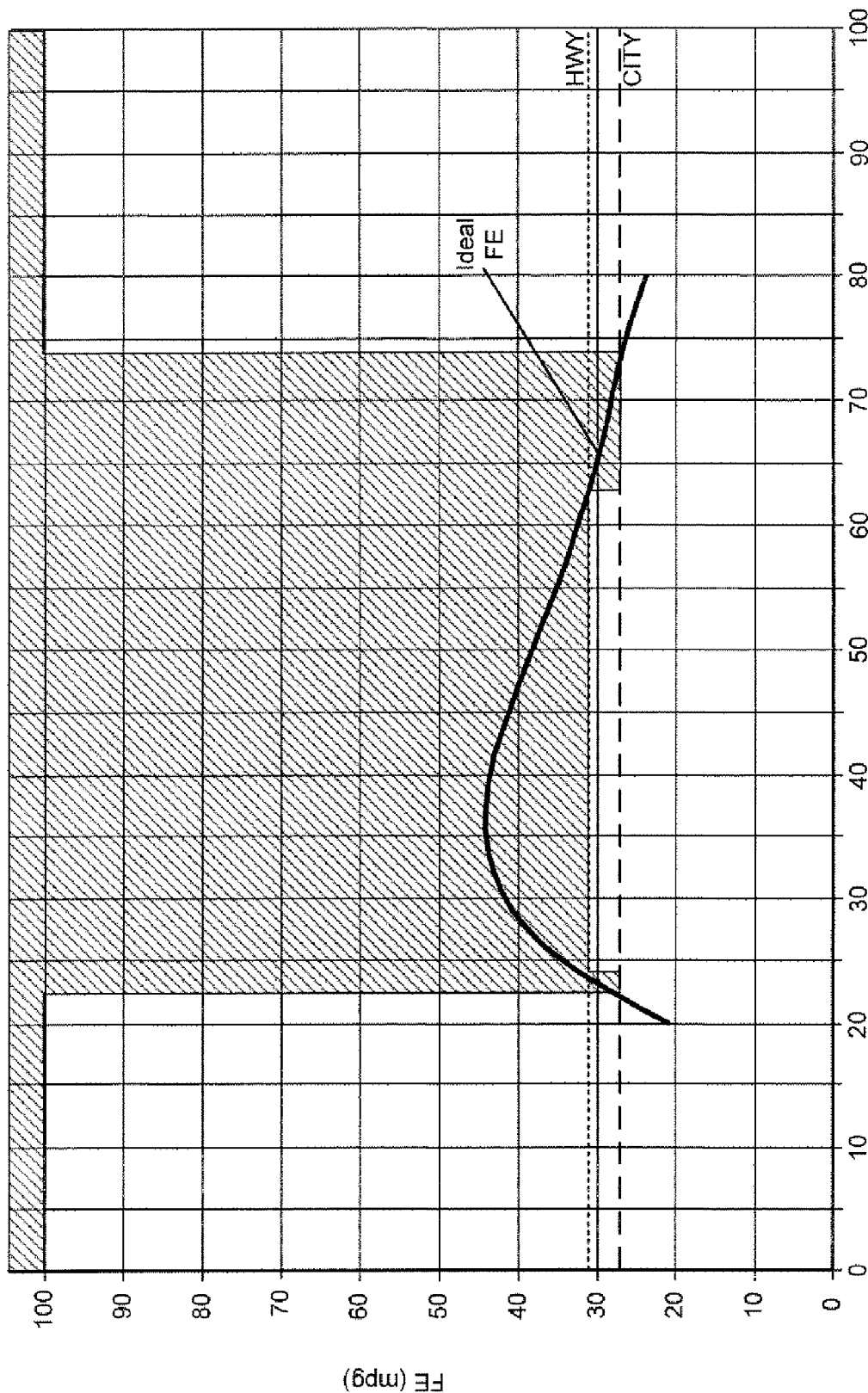
FIG. 2 is a graph illustrating FE indicator lamp illumination areas in accordance with the FE indicator lamp illumination control of the present disclosure.

The FE indicator lamp illumination control qualifies the good or desired FE using one or more pre-determined criteria. For example, the good FE is based on the vehicle's ideal capabilities as a function of vehicle speed. As shown in FIG. 2, the vehicle's ideal (e.g., no wind, grade or acceleration) FE as a function of vehicle speed ($V_{VEH}$) is provided. Whenever the instantaneous FE is greater than a threshold value at the respective $V_{VEH}$, the FE indicator lamp 50 is illuminated. More specifically, the FE indicator lamp 50 is illuminated whenever the FE is within the shaded region. Although an indicator lamp 50 is described, it is also anticipated that a digital read-out of the instantaneous FE can also be provided, so that the driver is aware of the actual FE value at any moment.

In one alternative, if the vehicle is able to achieve the HWY label value at the ideal condition, the HWY label value is used as the threshold. If only the CITY label value can be achieved under the ideal condition, the CITY label value is used as the threshold. In another alternative, the CITY label value is used as the threshold at lower speeds, and the HWY label value is used as the threshold at higher speeds. For example, below a city speed (e.g., 45 mph), the CITY label value is the threshold, and at speeds above a highway speed (e.g., 60 mph), the HWY label value is the threshold. At speeds between the city and highway speeds, the threshold value is linearly interpolated across the CITY and the HWY label values.

In addition to steady FE thresholds, the indicator lamp 50 is also illuminated during operation in hybrid fuel-off, regenerative braking, HEOff, electric creep and the like, to coach the vehicle operator to achieve better FE. More specifically, when the fuel is cut, for example, the calculated FE saturates at an upper limit (e.g., 199.9 mpg). For fuel-on operation, the indicator lamp 50 is not illuminated for vehicle speeds under a lower threshold ($V_{MIN}$) (e.g., 20 mph), because the instantaneous FE value changes very rapidly with vehicle speed and driver input. However, the indicator lamp 50 is illuminated at vehicle speeds at or under the lower threshold if the fuel is off. On the other end of the speed spectrum, the indicator lamp 50 is not illuminated during fuel-on operation at speeds at or above an upper threshold ($V_{MAX}$) (e.g., 75 mph). In this manner, the vehicle operator is not encouraged to drive at over speed limits.

The FE indicator lamp control implements an anti-busy control to prevent flashing of the indicator lamp. The anti-busy calibrations include, but are not limited to, a minimum/maximum $V_{VEH}$ and hysteresis on the minimum/maximum $V_{VEH}$, a minimum off time ($t_{OFFTHR}$), a minimum on time ($t_{ONTHR}$), minimum wait times ($t_{WAIT1}$, $t_{WAIT2}$), upper and lower FE thresholds as a function of $V_{VEH}$ and FE value freezing during transmission shifts.

Once the indicator lamp 50 is turned off, it remains off for $t_{OFFTHR}$. Similarly, once the indicator lamp 50 is turned on, it remains on for $t_{ONTHR}$. In this manner, flashing of the indicator lamp 50 is prohibited. When entering the HEOff mode, and assuming that the indicator lamp 50 is not on, the indicator lamp 50 is turned on after $t_{WAIT}$. Again, flashing of the indicator lamp 50 is prohibited in the event that the HEOff mode is exited shortly upon being initiated.

Under conditions where the driver steps into the accelerator and the accelerator pedal position is deemed high, $t_{OFFTHR}$ is replaced by an accelerator pedal related time ($t_{AP}$), which is less than $t_{OFFTHR}$. In this manner, the indicator lamp 50 is turned off more rapidly when the driver steps into the accelerator pedal. It is also anticipated that the instantaneous FE value is frozen during transmission shifts, to prevent the transient shift condition from influencing the indicator lamp on/off decision.

Figure 3:
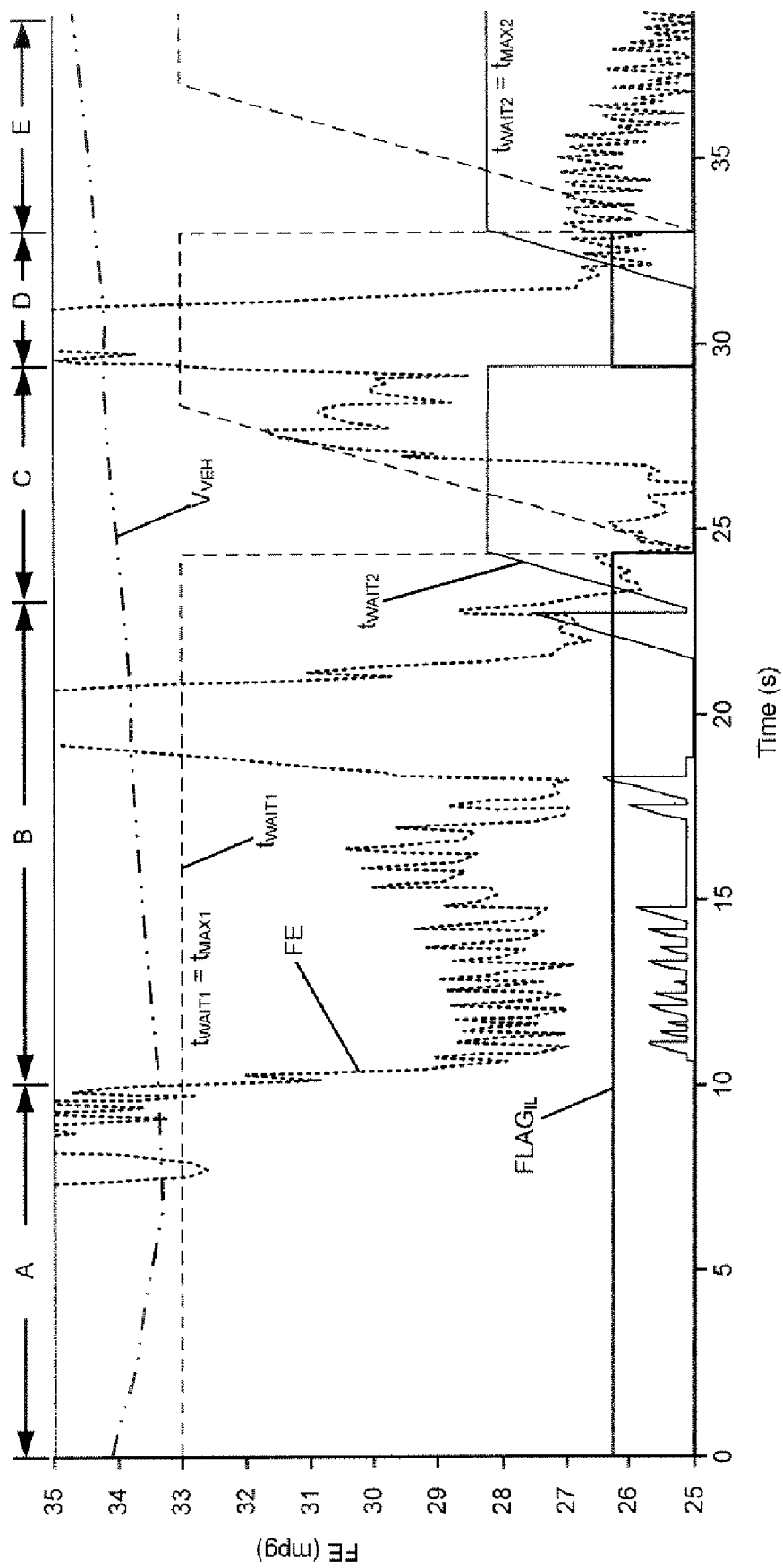
FIG. 3 is a graph illustrating exemplary control parameters implemented by the FE indicator lamp illumination control of the present disclosure.

Referring now to FIG. 3, an exemplary driving cycle is illustrated, wherein an FE of 29 miles-per-gallon (mgp) is provided as an upper FE threshold and an FE of 27 mpg is provided as a lower FE threshold. During an initial period A, the indicator lamp 50 is illuminated, as indicated by an indicator lamp flag ($FLAG_{IL}$) being set equal to 1. A first wait timer ($t_{WAIT1}$) trace has achieved a maximum ($t_{MAX1}$) because the indicator lamp 50 has been illuminated for $t_{MAX1}$, indicating that that the indicator lamp 50 could be immediately turned off if the FE falls below the lower FE threshold for a sufficient time, as discussed in further detail below.

During a subsequent period B, the FE oscillates between the upper and lower FE thresholds. Each time the FE falls below the lower FE threshold, a second wait timer ($t_{WAIT2}$) is initiated. If the FE goes back above the lower FE threshold, $t_{WAIT2}$ is reset to zero. During the period C, the FE remains below the lower FE threshold for a sufficient time (i.e., $t_{WAIT2}$ is equal to $t_{MAX2}$), and the indicator lamp 50 is switched off, as indicated by $FLAG_{IL}$ going to zero. At the same point, $t_{WAIT1}$ is reset to zero and begins running again toward $t_{MAX1}$.

At the beginning of the period D, the FE has remained above the upper FE threshold for a sufficient time period, and the indicator lamp 50 is again illuminated. $t_{WAIT2}$ is concurrently reset to zero. At the beginning of the period E, the FE has remained below the lower FE threshold for a sufficient time period (i.e., $t_{WAIT2}$ is equal to $t_{MAX2}$), and the indicator lamp is switched off.

Figure 4:
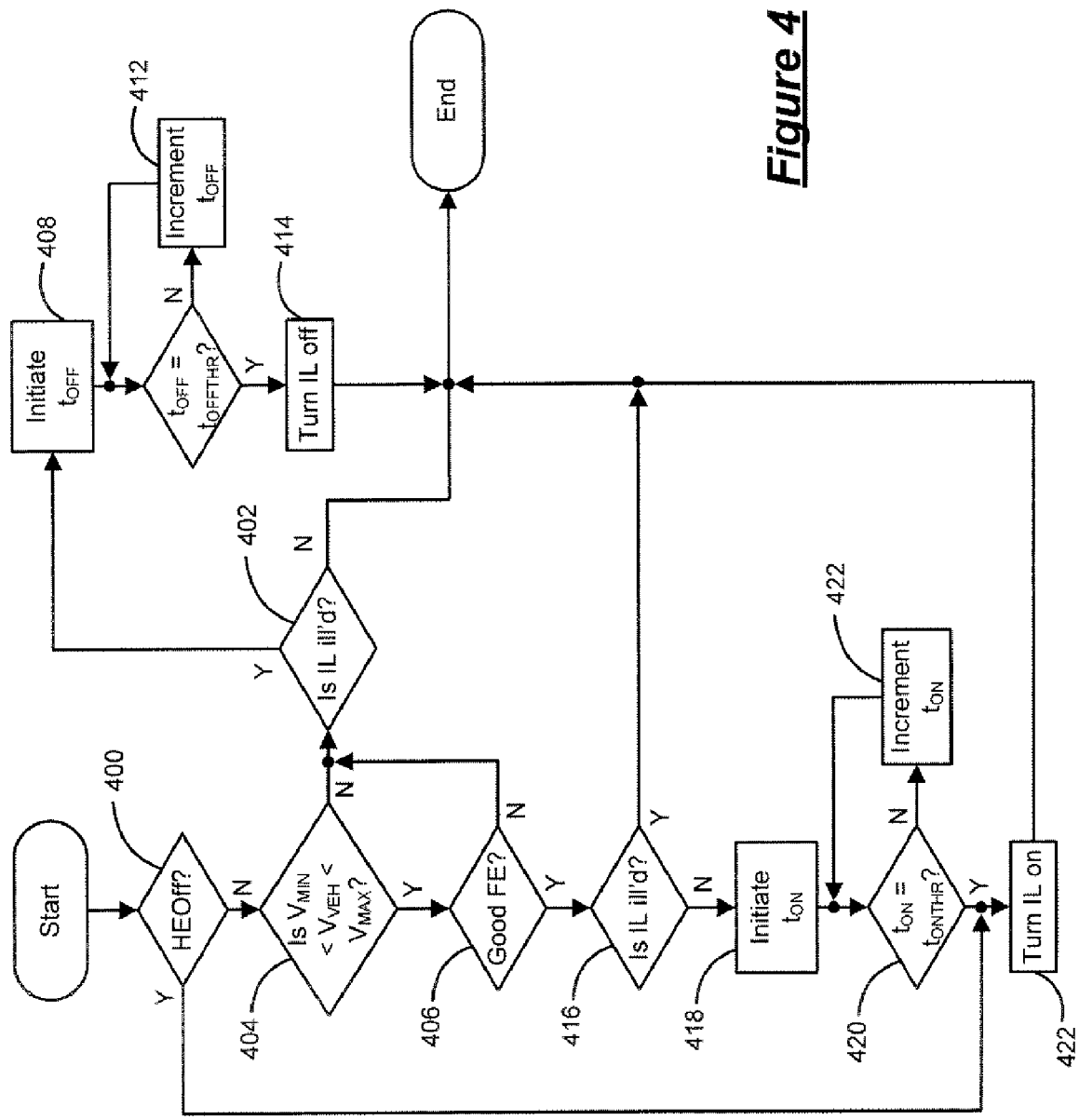
FIG. 4 is a flowchart illustrating exemplary steps executed by the FE indicator lamp control of the present disclosure.

Referring now to FIG. 4, exemplary steps executed by the indicator lamp illumination control will be described in detail. In step 400, control determines whether the HEOff mode is active. If the HEOff mode is active, control continues in step 402. If the HEOff mode is not active, control continues in step 404. Control determines whether $V_{VEH}$ is within a velocity range that is defined between $V_{MAX}$ and $V_{MIN}$ in step 404. If $V_{VEH}$ is not within the velocity range, control continues in step 402. If $V_{VEH}$ is within the velocity range, control continues in step 406.

In step 402, control determines whether the indicator lamp 50 is illuminated. If the indicator lamp 50 is not illuminated, control ends. If the indicator lamp 50 is illuminated, control initiates a timer (t) in step 408. In step 410, control determines whether t is equal to $t_{OFFTHR}$. If t is not equal to $t_{OFFTHR}$, control increments t in step 412 and loops back to step 410. If t is equal to $t_{OFFTHR}$, control turns the indicator lamp 50 off in step 414 and control ends. By delaying the turning off of the indicator lamp 50 by $t_{OFFTHR}$, it is ensured that the indicator lamp 50 remains on for at least $t_{OFFTHR}$ to prohibit flashing of the indicator lamp 50.

In step 406, control determines whether the FE is sufficiently good to warrant illumination of the indicator lamp 50. A good FE is determined as described above. More specifically, a good threshold is provided based on one of the ideal FE for a given $V_{VEH}$, the HWY label or the CITY label. If the FE is deemed not good, control continues in step 402. If the FE is deemed good, control continues in step 416.

In step 416, control determines whether the indicator lamp 50 is illuminated. If the indicator lamp 50 is illuminated, control ends. If the indicator lamp 50 is not illuminated, control initiates t in step 418. In step 420, control determines whether t is equal to $t_{ONTHR}$. If t is not equal to $t_{ONTHR}$, control increments t in step 422 and loops back to step 420. If t is equal to $t_{ONTHR}$, control turns the indicator lamp 50 on in step 424 and control ends. By delaying the turning off of the indicator lamp 50 by $t_{ONTHR}$, it is ensured that the indicator lamp 50 remains on for at least $t_{ONTHR}$ to prohibit flashing of the indicator lamp 50.

Figure 5:
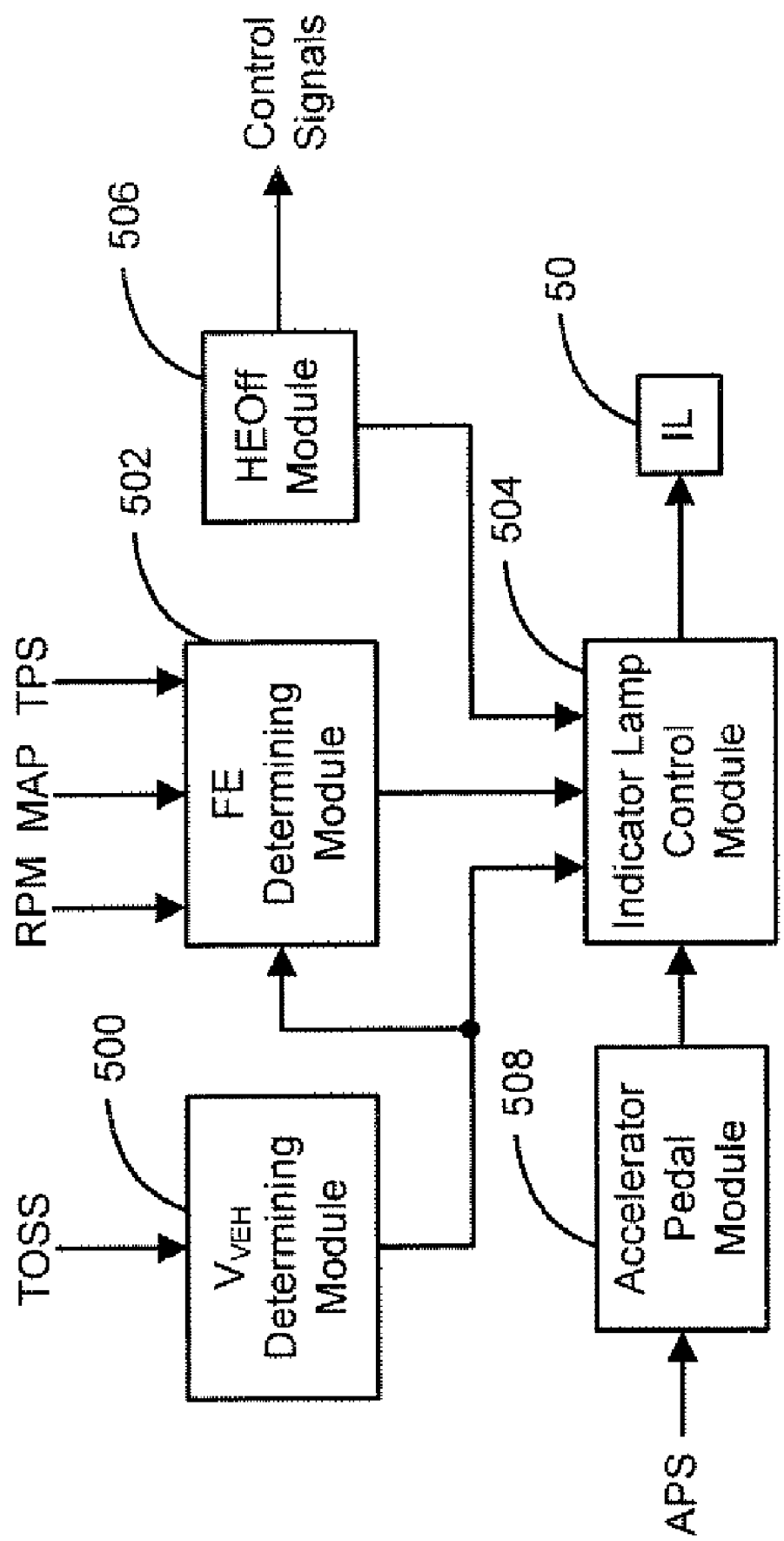
FIG. 5 is a functional block diagram of exemplary modules that execute the FE indicator lamp illumination control of the present disclosure.

Referring now to FIG. 5, exemplary modules that execute the indicator lamp illumination control will be described in detail. The exemplary modules include a $V_{VEH}$ determining module 500, an FE determining module 502, an indicator lamp control module 504, a HEOff module 506 and an accelerator pedal module 508. The $V_{VEH}$ determining module 500 determines $V_{VEH}$ based on a vehicle operating parameter or parameters. For example, $V_{VEH}$ can be determined based on a transmission output shaft speed signal (TOSS) and or ABS signals provided by ABS sensors associated with each wheel of the hybrid vehicle.

The FE determining module 502 determines the instantaneous FE based on a plurality of vehicle operating conditions including, but not limited to, an engine RPM, a manifold absolute pressure (MAP), a throttle position signal (TPS) and $V_{VEH}$. The indicator lamp control module 504 regulates the on and off state of the indicator lamp 50 based on the signals from the various other modules, in accordance with the indicator lamp illumination control described in detail above.

The HEOff module 506 regulates whether to operate the hybrid electric vehicle in the HEOff mode and generates corresponding control signals, as well as a signal that is received by the indicator lamp control module 504. The accelerator pedal module 508 monitors an accelerator pedal position signal (APS) and generates a signal that is received by the indicator lamp control module 504 when the APS exceeds a threshold value.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A fuel economy (FE) indicator lamp regulation system for a hybrid electric vehicle having an internal combustion engine, comprising:
   an FE indicator lamp;
   first module that calculates an instantaneous FE of said hybrid electric vehicle;
   a second module that determines a velocity of said hybrid electric vehicle; and
   a third module that switches said FE indicator lamp between an on state and an off state based on said instantaneous FE and said velocity.

2. The FE indicator lamp regulation system of claim 1 wherein said FE indicator lamp is switched to said off state when said velocity is outside of a velocity range that is defined between a minimum velocity threshold and a maximum velocity threshold.

3. The FE indicator lamp regulation system of claim 1 wherein said third module determines an FE threshold based on said velocity and switches said FE indicator lamp to said on state when said instantaneous FE remains above said FE threshold for a threshold time period.

4. The FE indicator lamp regulation system of claim 1 wherein said third module determines an FE threshold based on said velocity and switches said FE indicator lamp to said off state when said instantaneous FE remains below said FE threshold for a threshold time period.

5. The FE indicator lamp regulation system of claim 1 wherein said third module initiates an off timer upon switching said FE indicator lamp to said off state, wherein switching of said indicator lamp to said on state is inhibited until said off timer achieves a threshold time.

6. The FE indicator lamp regulation system of claim 1 further comprising a fourth module that selectively initiates a hybrid engine off mode, wherein said third module switches said FE indicator lamp to said on state when in said hybrid engine off mode for a threshold time period.

7. The FE indicator lamp regulation system of claim 1 further comprising a fourth module that monitors an accelerator pedal position, wherein said third module switches said FE indicator lamp to said off state when said instantaneous FE is below a threshold FE for a threshold time, and wherein said threshold time is determined based on said accelerator pedal position.

8. The FE indicator lamp regulation system of claim 7 wherein said threshold time is reduced when said accelerator pedal position exceeds a threshold accelerator pedal position.

9. A method of regulating illumination of a fuel economy (FE) indicator lamp between an on state and an off state in a hybrid electric vehicle having an internal combustion engine, comprising:
calculating an instantaneous FE of said hybrid electric vehicle;
determining a velocity of said hybrid electric vehicle; and
switching said FE indicator lamp between said on state and said off state based on said instantaneous FE and said velocity.

10. The method of claim 9 wherein said FE indicator lamp is switched to said off state when said velocity is outside of a velocity range that is defined between a minimum velocity threshold and a maximum velocity threshold.

11. The method of claim 9 further comprising:
determining an FE threshold based on said velocity; and
switching said FE indicator lamp to said on state when said instantaneous FE remains above said FE threshold for a threshold time period.

12. The method of claim 9 further comprising:
determining an FE threshold based on said velocity; and
switching said FE indicator lamp to said off state when said instantaneous FE remains below said FE threshold for a threshold time period.

13. The method of claim 9 further comprising initiating an off timer upon switching said FE indicator lamp to said off state, wherein switching of said indicator lamp to said on state is inhibited until said off timer achieves a threshold time.

14. The method of claim 9 further comprising:
initiating a hybrid engine off mode; and
switching said FE indicator lamp to said on state when in said hybrid engine off mode for a threshold time period.

15. The method of claim 9 further comprising:
monitoring an accelerator pedal position; and
switching said FE indicator lamp to said off state when said instantaneous FE is below a threshold FE for a threshold time, wherein said threshold time is determined based on said accelerator pedal position.

16. The method of claim 15 wherein said threshold time is reduced when said accelerator pedal position exceeds a threshold accelerator pedal position.

17. A method of regulating illumination of a fuel economy (FE) indicator lamp between an on state and an off state in a hybrid electric vehicle having an internal combustion engine, comprising:
calculating an instantaneous FE of said hybrid electric vehicle;
determining a velocity of said hybrid electric vehicle;
switching said FE indicator lamp between said on state and said off state based on said instantaneous FE and said velocity, wherein said FE indicator lamp is switched to said off state when said velocity is outside of a velocity range that is defined between a minimum velocity threshold and a maximum velocity threshold;
initiating a hybrid engine off mode; and
switching said FE indicator lamp to said on state when in said hybrid engine off mode for a threshold time period.

18. The method of claim 17 further comprising:
determining an FE threshold based on said velocity; and
switching said FE indicator lamp to said on state when said instantaneous FE remains above said FE threshold for a second threshold time period.

19. The method of claim 17 further comprising:
determining an FE threshold based on said velocity; and
switching said FE indicator lamp to said off state when said instantaneous FE remains below said FE threshold for a second threshold time period.

20. The method of claim 17 further comprising initiating an off timer upon switching said FE indicator lamp to said off state, wherein switching of said indicator lamp to said on state is inhibited until said off timer achieves a threshold time.

21. The method of claim 17 further comprising:
monitoring an accelerator pedal position; and
switching said FE indicator lamp to said off state when said instantaneous FE is below a threshold FE for a second threshold time, wherein said second threshold time is determined based on said accelerator pedal position.

22. The method of claim 21 wherein said second threshold time is reduced when said accelerator pedal position exceeds a threshold accelerator pedal position.

* * * * *